July 5, 1949.  J. H. BOOTH  2,475,541
PROPELLER DAMPENER DRIVE

Filed April 29, 1946  2 Sheets-Sheet 1

Inventor
JAMES H. BOOTH.

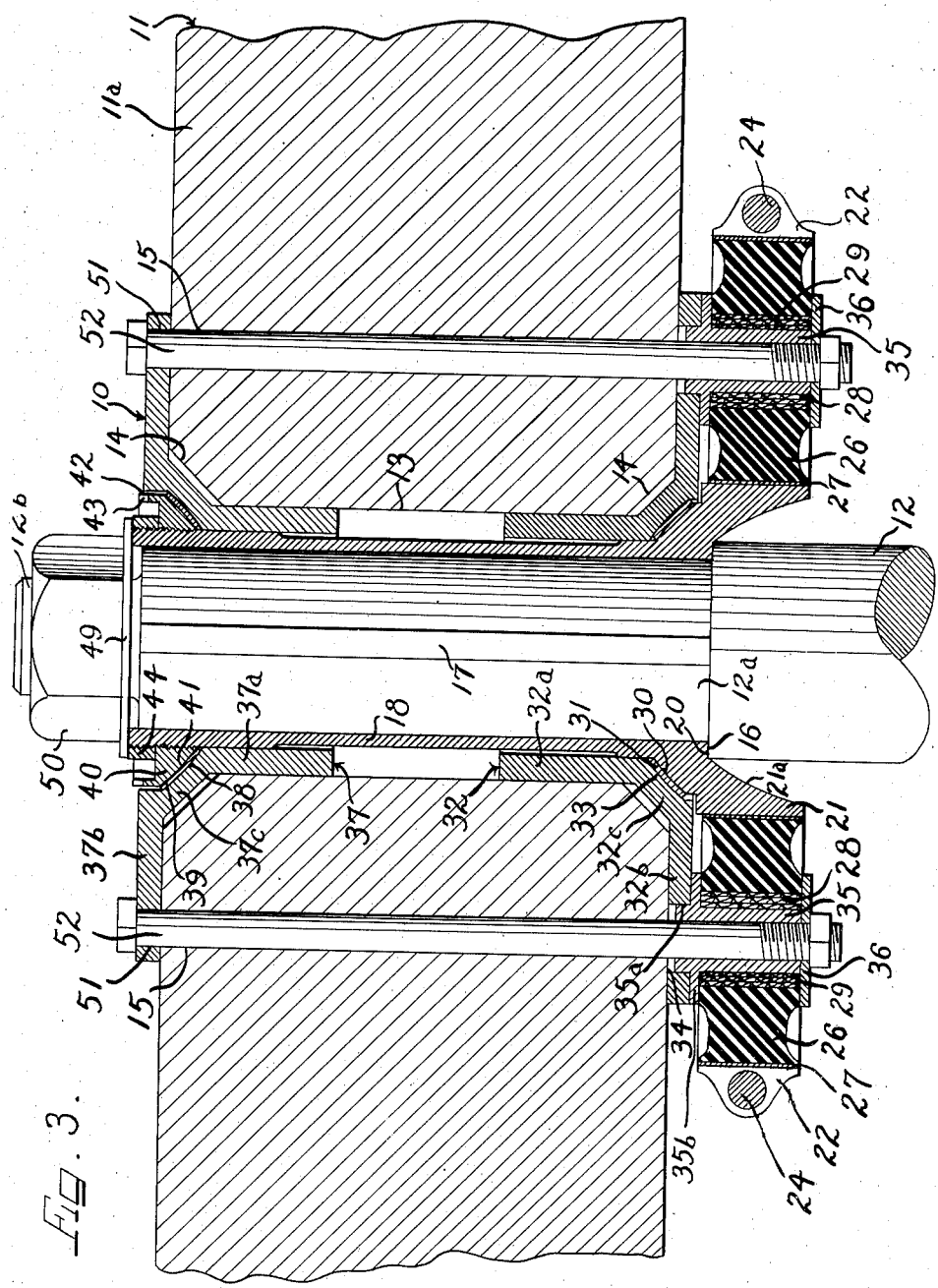

Patented July 5, 1949

2,475,541

UNITED STATES PATENT OFFICE 2,475,541

PROPELLER DAMPENER DRIVE

James H. Booth, Detroit, Mich., assignor to Thompson Products, Inc., Cleveland, Ohio, a corporation of Ohio Application April 29, 1946, Serial No. 665,875

6 Claims. (Cl. 64—27)

1

This invention relates to a mounting for air screws and the like whereby vibration is dampened out or absorbed. Specifically this invention deals with a propeller dampener drive that transmits rotative movement of an engine crankshaft to a propeller through resilient rubber bushings that are arranged for dampening out resonance periods between the shaft and propeller.

The dampener drive of this invention has bearings which carry all thrust loads and alignment torque so that the rubber bushings are only subjected to engine torque loads. The drive includes a sleeve keyed on the crankshaft of the driving engine and having laterally extending ears at one end thereof defining housings for the rubber bushings. This sleeve receives opposed flanged bosses which extend into the opposite sides of the propeller hub bore. The flanges of the bosses overlie the front and back faces of the propeller hub and through bolts connect the propeller to the bosses. Some of these through bolts extend through trunnion blocks seated in the rubber bushings. The trunnions are preferably seated in journaled relation with the flange of the adjacent boss so that shear load is not transmitted to the through bolts.

A feature of the invention resides in the provision of a fragmental spherical thrust seat on the sleeve for receiving one of the flanged bosses together with a nut having a fragmental spherical thrust face for seating in the other flanged boss. This arrangement makes a self-centering assembly without however permitting relative movement of the connected parts after they have been seated.

It is then an object of this invention to provide a drive arrangement for air screws and the like which will dampen out vibrations to prevent development of damaging vibratory stresses.

Another object of the invention is to provide a propeller dampener drive wherein a sleeve member on an engine crankshaft has laterally projecting ears that carry rubber bushings and wherein the propeller is driven from these bushings through trunnion members anchored in a flanged boss carried by the propeller.

Another object of the invention is to provide a simplified inexpensive propeller dampener drive for lightweight aircraft and the like.

A still further object of this invention is to provide a compact inexpensive and readily accessible dampener drive arrangement for air screws and the like.

A further object of the invention is to provide a propeller drive wherein torque loads are transmitted through rubber blocks without exerting bending moments on clamping bolts that are used to assemble the parts.

Other and further objects of the invention will be apparent to those skilled in the art from the following detailed description of the annexed sheets of drawings which, by way of a preferred example only, illustrate one embodiment of the invention.

On the drawings:

Figure 3 is a longitudinal cross sectional view, with parts in side elevation, taken along the line III—III of Fig. 2.

As shown on the drawings:

Figure 1:
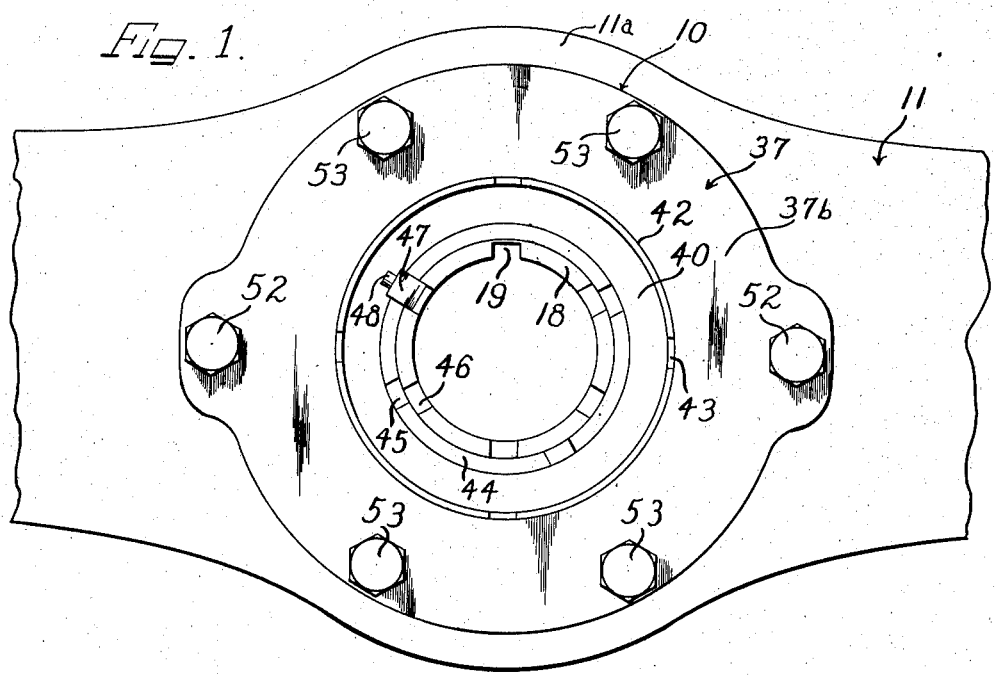
Figure 1 is a front elevational view of a propeller mounting according to this invention and illustrating the hub portion of a propeller driven by the mounting.
Figure 2:
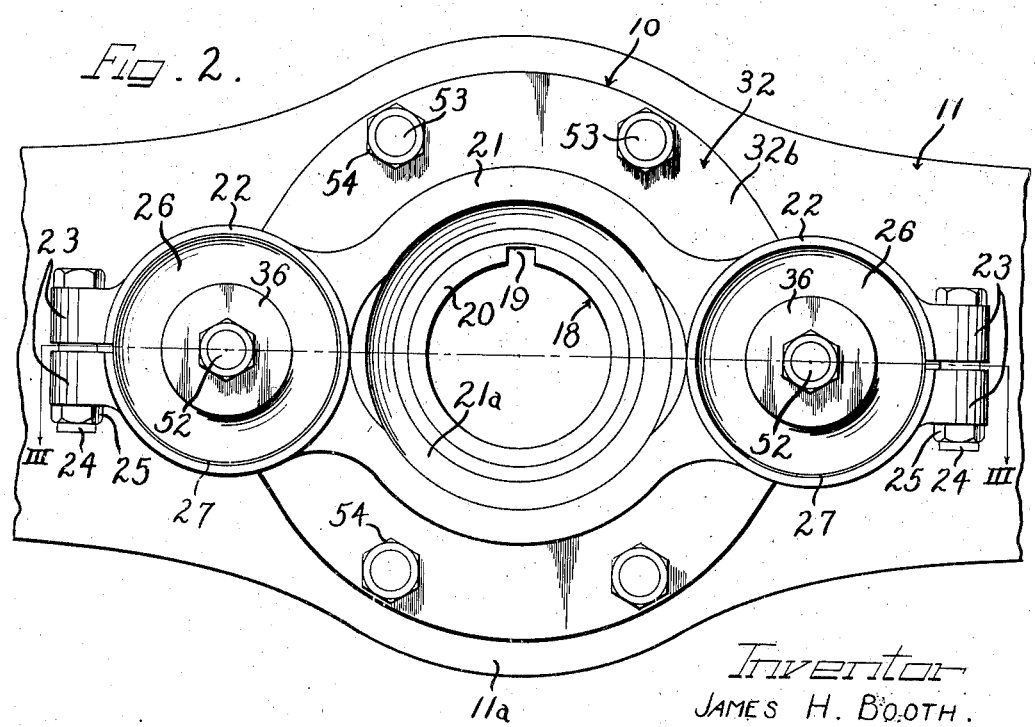
Figure 2 is a rear elevational view of the assembly of Fig. 1.

The dampener drive assembly 10 of this invention is illustrated as drivingly mounting and connecting a propeller or air screw 11 on a crankshaft 12. The propeller 11 has a central hub portion 11a with a cylindrical bore 13 therethrough. The ends of the bore are beveled at 14 to provide enlarged mouths. The hub portion 11a has a plurality of bolt holes 15 at intervals around the bore 13.

The crankshaft 12 has a reduced diameter portion 12a at its forward end extending to a threaded end portion 12b. A shoulder 16 is provided at the bottom or end of the reduced portion 12a. A key 17 is provided on the reduced portion 12a along the length thereof to drivingly connect with the mounting 10.

The mounting 10 includes a cylindrical sleeve 18 for mounting on the portion 12a of the shaft 12. The sleeve 18 has a key slot 19 receiving the key 17 on the shaft. A shoulder 20 is provided at one end of the sleeve for seating on the shoulder 16 of the shaft. A ring-like head 21 of larger diameter than the sleeve 18 is integral with one end of the sleeve adjacent to and surrounding the shoulder 20. The head 21 is hollow, being preferably equipped with a fragmental spherical bore 21a extending inwardly from the end of a head to the shoulder 20. This arrangement permits the head to surround the shaft 12 as shown in Fig. 3.

Split ring housings 22 project laterally from diametrically opposite sides of the head 21. These housings 22 are in the form of laterally extending ears on an enlarged ring head at one end of the sleeve 18.

The housings 22 have bosses 23 on opposite sides of the split portion thereof to receive clamping bolts 24 having nuts 25 threaded thereon.

The ring housings 22 receive rubber bushings 26 therein. These bushings 26 have metal shells or casings 27 therearound adapted to fit into the housings 22 and when the clamping bolts 24 draw the lugs 23 together, the housings 22 will be contracted to fixedly grip the casings 27 of the bushings.

The bushings have several turns of wire mesh screen 28 embedded therein around a central cylindrical aperture 29 therethrough. The screen 28 is effective to prevent shearing of the rubber adjacent the aperture 29.

The head 21 of the sleeve 18 has a fragmental spherical shaped ring portion 30 thereon around the end of the sleeve. This ring portion 30 receives a seat member 31 thereon. The seat 31 is shaped to conform with the fragmental spherical portion 30.

A flanged boss 32 has a sleeve portion 32a snugly fitting in the bore 13 of the propeller hub 11a and an outturned flange 32b overlying the back face of the propeller hub. The sleeve and flange are connected through a beveled portion 32c which has a fragmental spherical internal seating face 33 receiving the seat member 31. Thus the sleeve 32a is telescoped on the sleeve 18 and is bottomed on the seat member 31.

The flange 32b of the flanged boss 32 has a pair of diametrically opposed apertures 34. Trunnion blocks or pins 35 have pilot portions 35a snugly fitted in the apertures 34. Flanges 35b overlie the flange 32b and a main body portion of the trunnion pins extends from the flanges 35b into the bores 29 of the bushings 26. Washers 36 are bottomed on the rear ends of the trunnion pins 35.

A second flanged boss 37 has a sleeve portion 37a disposed around the sleeve 18 and fitting in the front end of the bore 13 together with an outturned ring flange 37b overlying the front face of the propeller hub 11a. A diagonal web portion 37c connects the sleeve 37a with the flange 37b and fits freely in the beveled bore mouth 14. The portion 37c of the boss 37 has a fragmental spherical recess 38 therein receiving a seat ring 39. The seat ring has fragmental spherical bearing walls. A nut 40 is threaded on the threaded outer end portion of the sleeve 18 and has a fragmental spherical thrust face 41 seating in the seat ring 39.

The nut 40 has a recessed end face with a cylindrical skirt or upstanding flange 42 therearound and equipped with notches 43 at spaced intervals. A rotating tool can be engaged in these notches 43 to tighten the nut 40 against the seat 39. A locking ring 44 is then threaded onto the sleeve 18 in the recessed face of the nut to be bottomed against the nut. This locking ring 44 has notches 45 at spaced intervals therearound so that it can be engaged by a tool and rotated into seated position. The end face of the sleeve 18 has similar notches 46 therein. One of these notches 46 is adapted to be aligned with a notch 45 in the locking ring 44. A locking member 47, in the form of an angle piece, then has one leg thereof seated in the aligned notches 45 and 46. The angle piece 47 is anchored to the ring 44 by means of a screw 48. The locking piece 47 is either flush with or below the faces of the ring 44 and end face of the sleeve 18 so that a washer 49 can be fully bottomed on these faces. A nut 50 is then threaded on the threaded portion 12b of the crankshaft against the washer 49 to lock the entire assembly in keyed relation to the shaft.

The flanged sleeve 37 has a plurality of apertures 51 in its flange 37b aligned with the bolt holes 15. At least two of these apertures 51 are also aligned with the apertures 34 in the flange 32b of the sleeve 32.

Bolts 52 are inserted through these apertures 51, through the holes 15, through the apertures 34, and thence through the trunnions 35 and washers 36. The threaded ends of the bolts receive nuts thereon to be bottomed on the washers 36. These two bolts 52 are longer than the four remaining bolts 53 which are passed through the other holes 15 and through apertures in the flange 32b. Nuts 54 are then threaded on these bolts 53 against the flange 32b.

The bolts 53 serve to clamp the flanged sleeves 32 and 37 on the propeller hub 11a. These sleeves can be drawn together because the beveled mouths 14 of the propeller hub bore 13 permit movement of the sleeves toward each other. Sleeves 32 and 37 are seated on the sleeve 18 in thrust engagement with the fragmental spherical seats 31 and 39. These fragmental spherical seats accommodate some misalignment of the parts but once the nut 40 coacts with the thrust face 30 of the sleeve 18, the sleeves 32 and 37 are fixedly locked on the sleeve 18.

Rotation of the crankshaft 12 is transmitted through the key 17 to the sleeve 18 and the housings 22 on the sleeve drive the rubber blocks 26 to rotate the trunnions 35. These trunnions 35 in turn are locked in the apertures 34 of the flange 32b of the sleeve 32 and drive the sleeve 32. The sleeve 32 however is clamped on the propeller hub 11a and cooperates through the bolts 52 and 53 to drive the propeller. It should be noted that bending moments are not applied to the bolts 52 because the trunnions 35 are firmly seated in the apertures 34 of the sleeve flange 32b and when subjected to torsion load by the blocks 26 do not impart this load on the bolts.

The rubber blocks 26 are interposed between the propeller 11 and the engine but since they extend laterally they can lie closely adjacent the back face of the propeller. In addition the hollow ring 21 provides for surrounding the crankshaft with part of the mounting structure to provide a telescoped arrangement of parts thereby conserving space. As a result the propeller can be mounted very closely to the engine casing and still be equipped with a dampener drive.

The entire dampener drive assembly of this invention can be removed from the crankshaft without displacement of any of the parts. The parts are readily removed from the propeller and if it is desirable to change rubber blocks 26 it is only necessary to loosen the clamping bolts 24 and 52. New rubber blocks are then quickly inserted.

Since all torsion load between the crankshaft and the propeller must pass through the rubber blocks vibrations of the parts are dampened and a resilient drive arrangement is insured.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A device for coupling a drive shaft with a propeller hub or the like which comprises a driving sleeve for receiving a drive shaft in keyed relation, a plurality of ring housings on one end of said sleeve extending laterally therefrom, opposed flanged sleeves on said driving sleeve and having outturned flanges for clamping a propeller hub or the like therebetween, rubber blocks in said ring housings of the driving sleeve, hollow trunnions in said blocks fitted in the flanges of one of said flanged sleeves, and draw bolts extending through the flanges of both sleeves and through said trunnion blocks for drivingly connecting the driving sleeve with a propeller hub or the like clamped between said flanges.

2. A device for coupling a drive shaft with a propeller hub which comprises a driving sleeve arranged to receive a crankshaft in keyed relation therein, a pair of opposed thrust bearings on said driving sleeve, one of said thrust bearings being adjustable toward and away from the other of said bearings, a pair of opposed flanged sleeves on said driving sleeve and bottomed on said thrust bearings, hollow pins on the flange of one of said flanged sleeves, rubber blocks receiving said hollow pins, and housings on said driving sleeve surrounding said rubber blocks whereby torque loads are transmitted between said crankshaft and said flanged sleeve by said rubber blocks, and a propeller hub clamped between said flanged sleeves to be driven thereby.

3. A device for coupling a drive shaft with a propeller hub which comprises a driving sleeve arranged for receiving an engine drive shaft in keyed relation, a pair of opposed thrust bearings on said sleeve, one of said bearings being adjustable toward and away from the other of said bearings, a propeller hub having a cylindrical bore therethrough with beveled mouths at the ends thereof, a pair of opposed flanged sleeves in said bore having the flanges thereof overlying the front and back faces of the hub, said beveled mouths of said bore accommodating movement of said sleeves toward each other to place the flanges thereof in clamping engagement with the hub, said driving sleeve having laterally extending ring housings thereon, rubber blocks in said ring housings, pins carried on the flange of the adjacent flanged sleeve and seated in said rubber blocks, and draw bolts extending through said propeller hub and through the flanges of said sleeves for uniting the flanged sleeves to the propeller hub, said rubber blocks transmitting all torque load from said driving sleeve to said propeller hub through said flanged sleeves and said thrust bearings on said driving sleeve accommodating all thrust loads free from said rubber blocks.

4. A propeller dampener drive comprising, in combination with a propeller having a hub with a bore therethrough and a crankshaft having a key carrying reduced diameter portion with a threaded end, a driving sleeve keyed on said reduced diameter portion of the crankshaft having laterally extending arms at the inner end thereof and a threaded portion on the outer end thereof, flanged bosses in said bore of the propeller hub having the flanges thereof overlying the faces of the hub, through bolts extending through said hub and overlying flanges of the bosses to lock the bosses on the hub, said driving sleeve having a thrust face at its inner end bottoming the adjacent boss, a nut threaded on the threaded portion of the driving sleeve having a thrust face engaging the adjacent boss, said thrust faces carrying all thrust loads between the propeller and crankshaft, pins anchored in the flange of the boss adjacent the arms of the driving sleeve, and rubber bushings connecting the pins and arms to transmit all torque loads between the shaft and propeller.

5. A dampener drive comprising a sleeve having a thrust face with laterally extending ring-like ears at one end thereof and threads on the other end thereof, a thrust nut screwed on said threads, spaced opposed bosses on said sleeve engaging said nut and thrust face respectively, a hub surrounding said bosses, flanges on said bosses overlying said hub, bolts extending through said hub and bosses, rubber bushings in said ears, and pins in said bushings anchored in the flange of the adjacent boss.

6. A propeller drive comprising a propeller hub having a bore therethrough, flanged bosses having sleeve portions seated in said bore and flange portions overlying the front and back faces of the hub, bolts extending through the hub and flange portions, said sleeve portions having opposed fragmental spherical thrust bearing walls therein, fragmental spherical seat rings bottomed on said walls, a driving member projecting through said sleeve portions and having opposed fragmental spherical thrust walls acting on said seat rings to anchor the bosses on the driving member, radially extending ears on said driving member adjacent the back face of the hub, rubber bushings in said ears, and pins on said flange portion overlying the back face of the hub seated in said bushings.

JAMES H. BOOTH.

REFERENCES CITED

The following references are of record in the file of this patent:

UNITED STATES PATENTS

| Number | Name | Date |
|---|---|---|
| 1,854,329 | Carter | Apr. 19, 1932 |
| 1,863,388 | Woolson | June 14, 1932 |
| 2,229,657 | Larason | Jan. 28, 1941 |
| 2,338,302 | Roche | Jan. 4, 1944 |
| 2,396,232 | Chilton | Mar. 12, 1946 |

FOREIGN PATENTS

| Number | Country | Date |
|---|---|---|
| 106,944 | Great Britain | June 14, 1917 |
| 468,338 | Great Britain | July 2, 1937 |
| 502,927 | France | Mar. 4, 1920 |